INVENTORS
STANLEY J. GARTNER
JEROME C. SMITH
BY
Michael Hertz,
ATTORNEY

July 25, 1961 S. J. GARTNER ET AL 2,993,981

CATHODE TABBER

Filed April 8, 1955 12 Sheets-Sheet 2

INVENTORS
STANLEY J. GARTNER
JEROME C. SMITH

BY Michael Hertz,
ATTORNEY

CATHODE TABBER

INVENTORS
STANLEY J. GARTNER
JEROME C. SMITH
BY Michael Hertz
ATTORNEY

July 25, 1961 S. J. GARTNER ET AL 2,993,981

CATHODE TABBER

Filed April 8, 1955 12 Sheets-Sheet 4

INVENTORS
STANLEY J. GARTNER
JEROME C. SMITH

BY Michael Hertz.

INVENTORS
STANLEY J. GARTNER
JEROME C. SMITH
BY Michael Hertz,
ATTORNEY

INVENTORS
STANLEY J. GARTNER
JEROME C. SMITH
BY Michael Hertz
ATTORNEY

INVENTORS
STANLEY J. GARTNER
JEROME C. SMITH
BY Michael Hertz
ATTORNEY

INVENTOR
STANLEY J. GARTNER
JEROME C. SMITH
BY Michael Hertz
ATTORNEY

INVENTORS
STANLEY J. GARTNER
JEROME C. SMITH
BY Michael Hertz,
ATTORNEY

July 25, 1961 S. J. GARTNER ET AL 2,993,981

CATHODE TABBER

Filed April 8, 1955 12 Sheets-Sheet 10

INVENTORS
STANLEY J. GARTNER
JEROME C. SMITH
BY Michael Hertz
ATTORNEY

INVENTORS
STANLEY J. GARTNER
JEROME C. SMITH
BY Michael Hertz
ATTORNEY

INVENTORS
STANLEY J. GARTNER
JEROME C. SMITH
BY Michael Hertz,
ATTORNEY

United States Patent Office 2,993,981
Patented July 25, 1961

2,993,981
CATHODE TABBER

Stanley J. Gartner, Emporium, and Jerome C. Smith, St. Marys, Pa., assignors, by mesne assignments, to Sylvania Electric Products Inc., Wilmington, Del., a corporation of Delaware Filed Apr. 8, 1955, Ser. No. 500,082
11 Claims. (Cl. 219—79)

This invention relates to an automatic tube manufacturing machine and in particular to a machine which incorporates means to apply tabs or electro-conductive elements to electrode elements.

It is a specific object of the invention to provide in such a machine automatic means to apply cathode tabs to cathodes, or cathode sleeves, in an assembled mount.

It is a further object of the invention to provide automatic means whereby tabs may be applied to a plurality of cathode sleeves in a mount incorporating more than one such sleeve.

It is yet another object of the invention to provide in an automatic machine which manufactures electron mounts, mechanism to apply tabs to electrodes thereof, such as cathodes or cathode sleeves, as a step in the manufacture of the mount, the tabbing mechanism being synchronized with the remaining mechanism of the machine.

It is still another object of the invention to provide a means whereby a mount is indexed through a plurality of stations to have a plurality of tabbing and ancillary operations performed upon it while single operations per stage of mount assembly are performed elsewhere in the machine.

Furthermore, it is an object of the invention to increase the number of stages in a machine having the stages arranged about a loop and without increasing the length of the machine by providing stages in a path or paths outside of the loop.

These and other objects of the invention will be clearer after reading the following specification in conjunction with the accompanying drawings in which.

Figure 6:
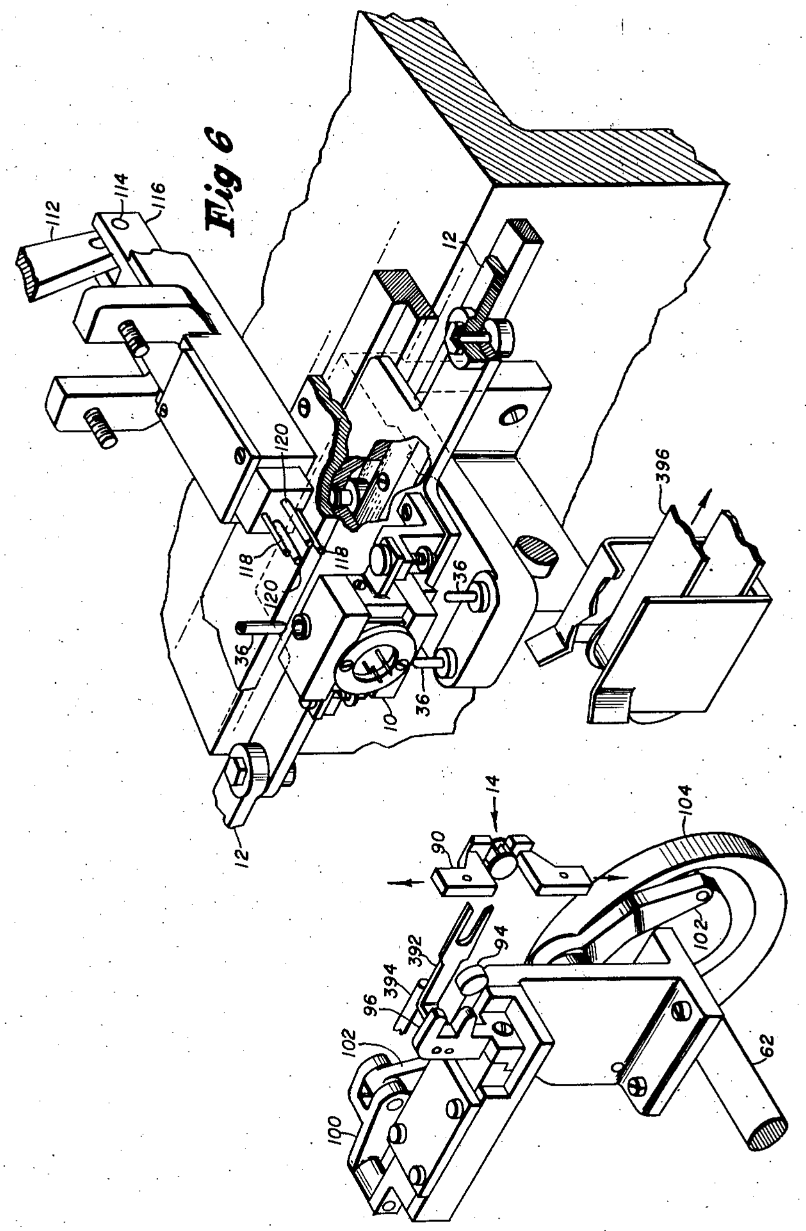
FIG. 6 is a more detailed view thereof.
Figures 6A, 7, 8:
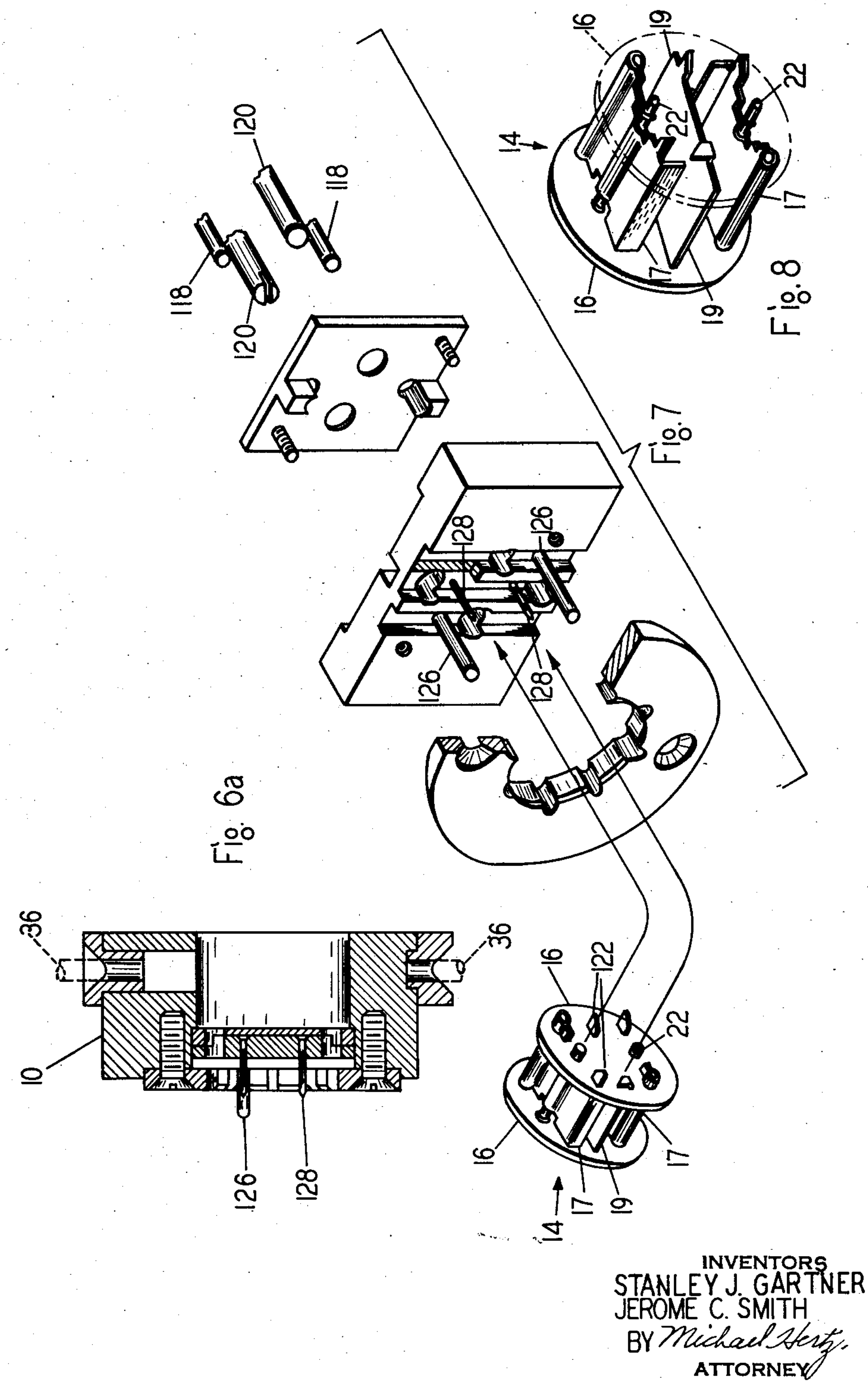

FIG. 6*a* is a vertical section through a mount block.

FIG. 7 is another detailed, exploded view, showing the association of ejector pins with the mount block and mount.

FIG. 8 is a perspective view of the mount, one of the spacer discs being shown in phantom to more clearly show the nature of the mount.

Figure 9A:
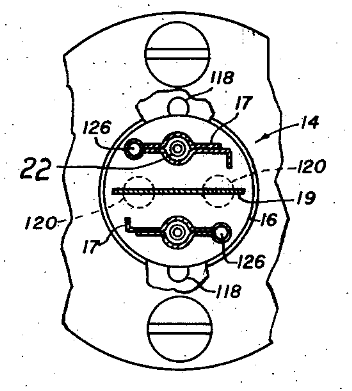
Figure 9:
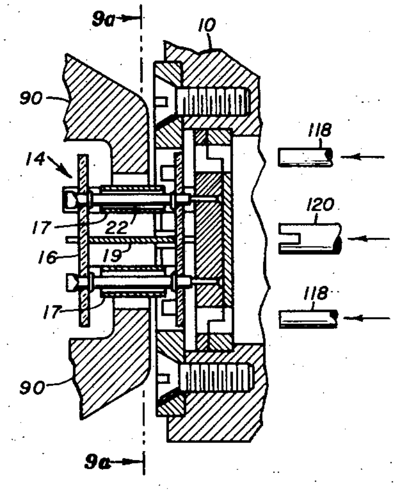

FIG. 9 is a view of the mount positioned between a pair of jaws just before ejector mechanism forces the mount from a mount block to the jaws.

FIG. 9*a* is a section on the line 9*a*—9*a* of FIG. 9.

Figure 10:
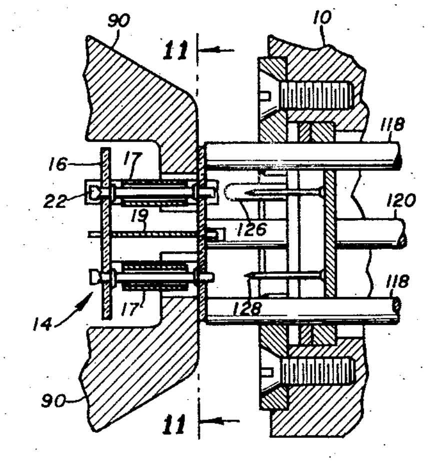

FIG. 10 shows the mount after it has been fully positioned between the jaws and the jaws have been moved to fully closed position against the anodes of the mount.

Figure 11:
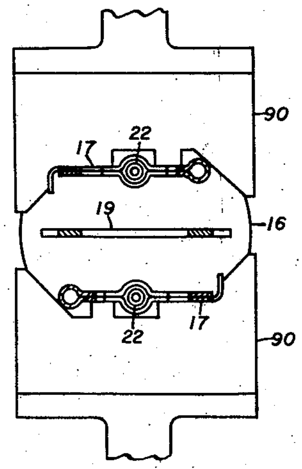

FIG. 11 is a section on the line 11—11 of FIG. 10.

Figure 3:
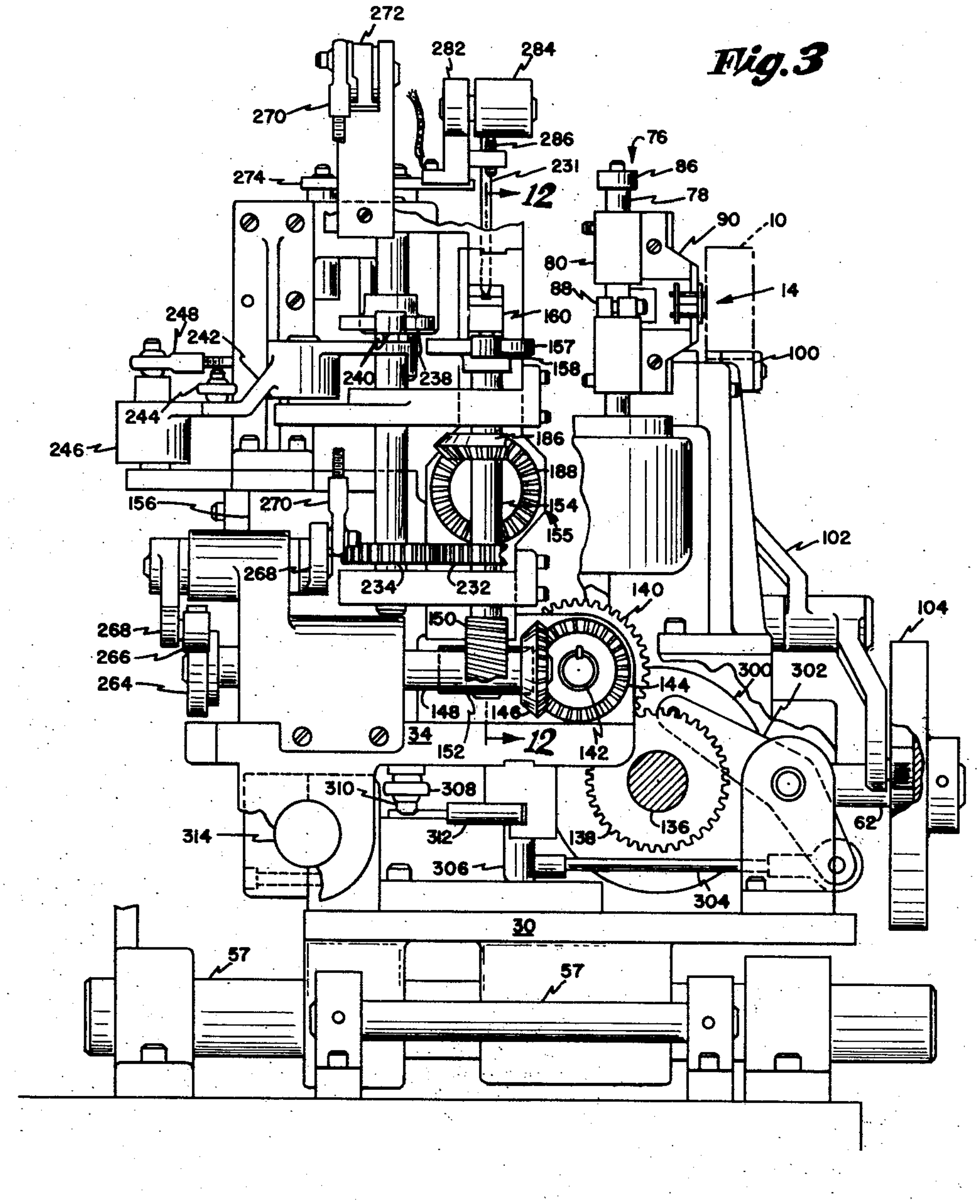
FIG. 3 is an end view of the device shown in FIG. 1 looking toward the left, with parts broken away for greater clarity of illustration.
Figure 12:
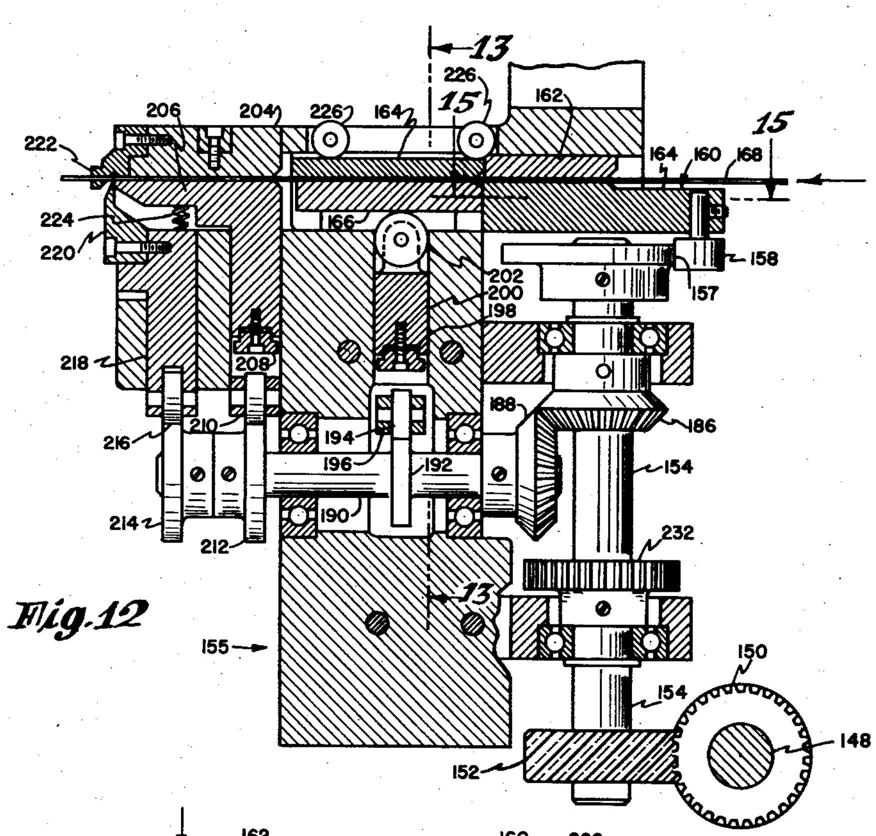

FIG. 12 is a section on the line 12—12 of FIG. 3.

Figure 13:
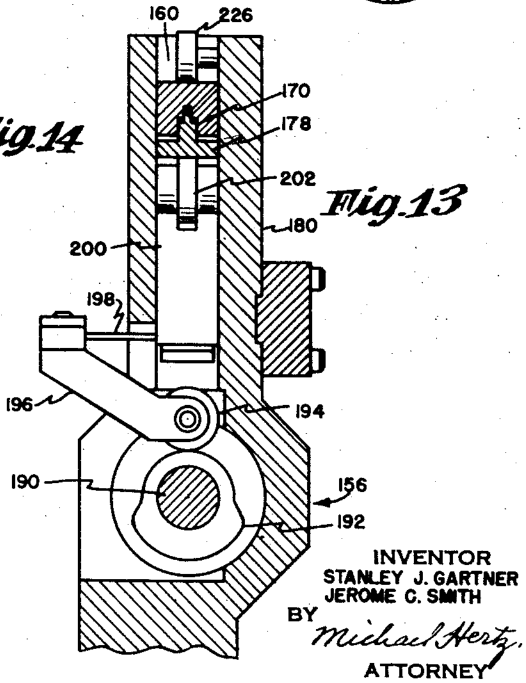

FIG. 13 is a section on the line 13—13 of FIG. 12.

Figure 14:
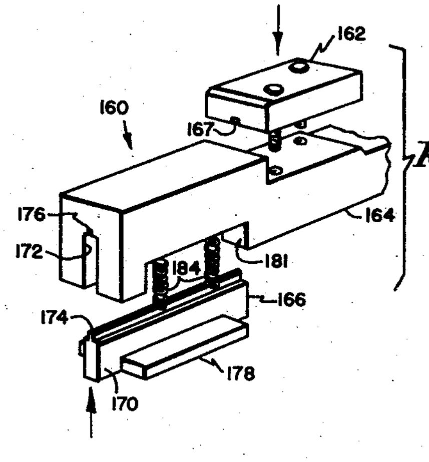

FIG. 14 is an exploded view of a portion of a tab ribbon feeding mechanism.

Figure 15:
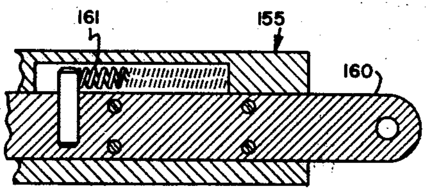

FIG. 15 is a section on the line 15—15 of FIG. 12.

Figure 2:
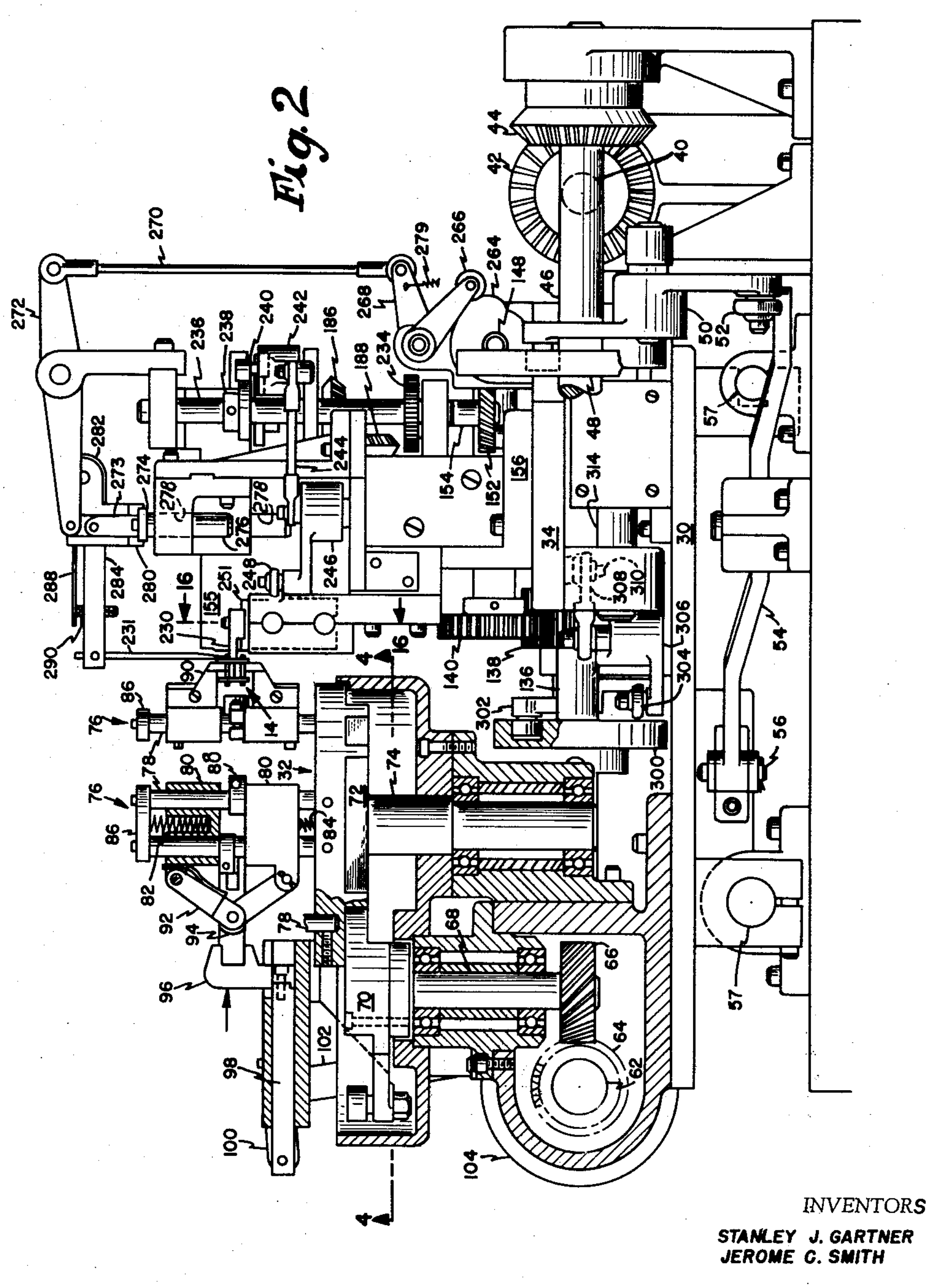
FIG. 2 is a section on the line 2—2 of FIG. 1.
Figure 16:
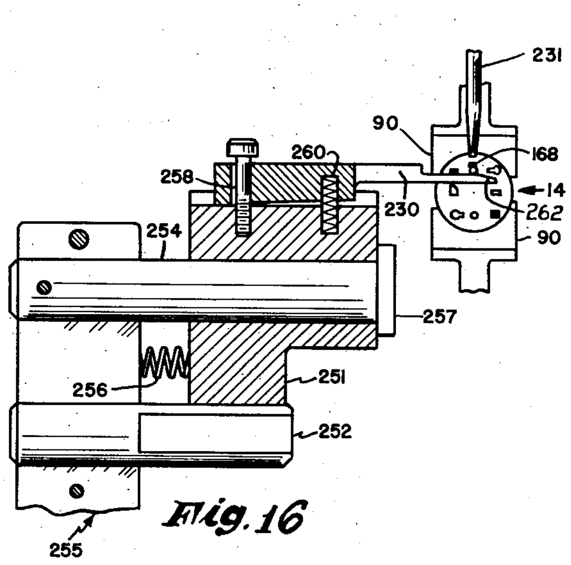

FIG. 16 is a section on the line 16—16 of FIG. 2.

Figure 17:
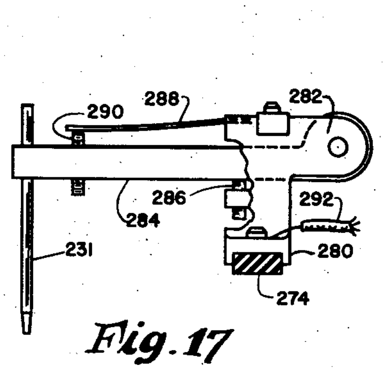

FIG. 17 is a detail of the construction of the top electrode at the second station of the tabbing device.

Figure 18:
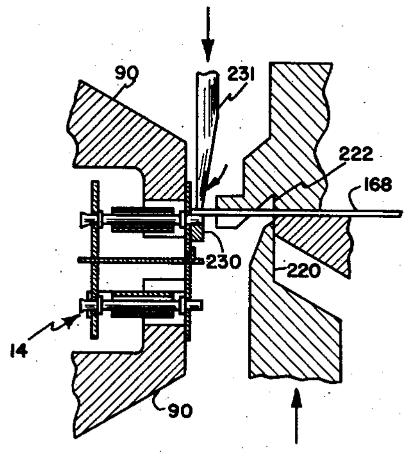

FIG. 18 is a detail view showing how the electrodes effect a welding of tabbing material to the upper of the cathode sleeves.

Figure 19:
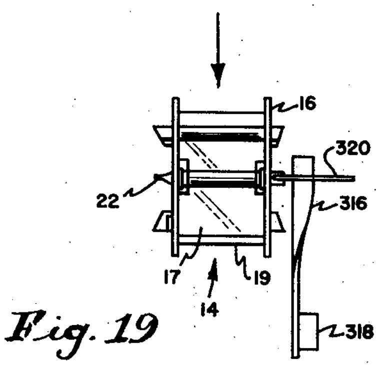

FIG. 19 is a detail showing a cam device about to engage a tab for bending the free end upwardly with reference to the sleeve on which the tab is welded.

Figure 20:
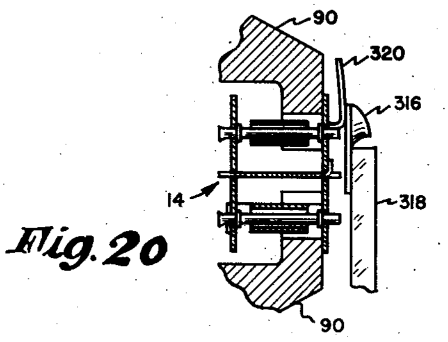

FIG. 20 is a sectional view in elevation, showing the bent tab toward the end of the bending operation.

Figure 1:
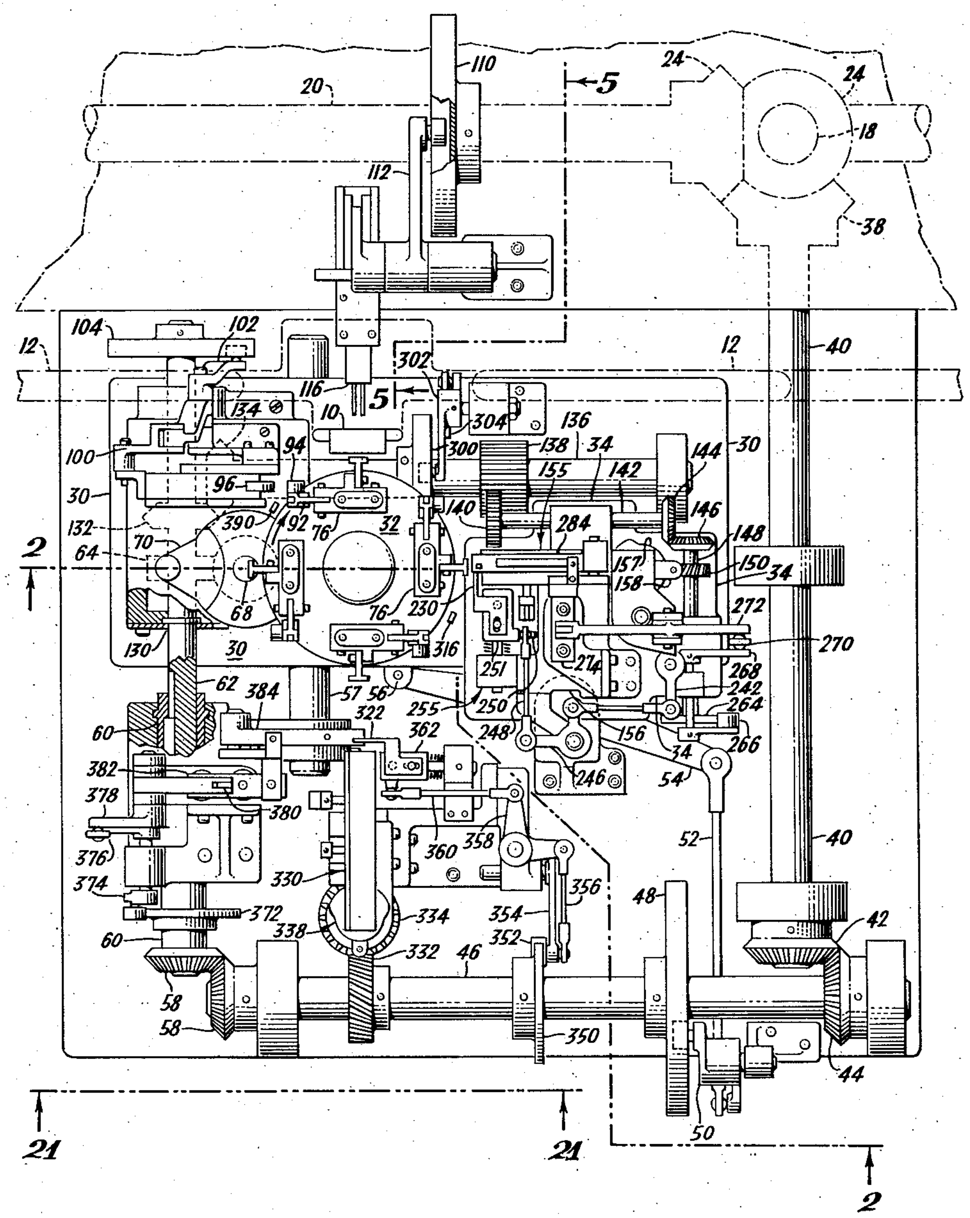
FIG. 1 is a plan view of the tabbing station of the mount manufacturing machine.
Figure 21:
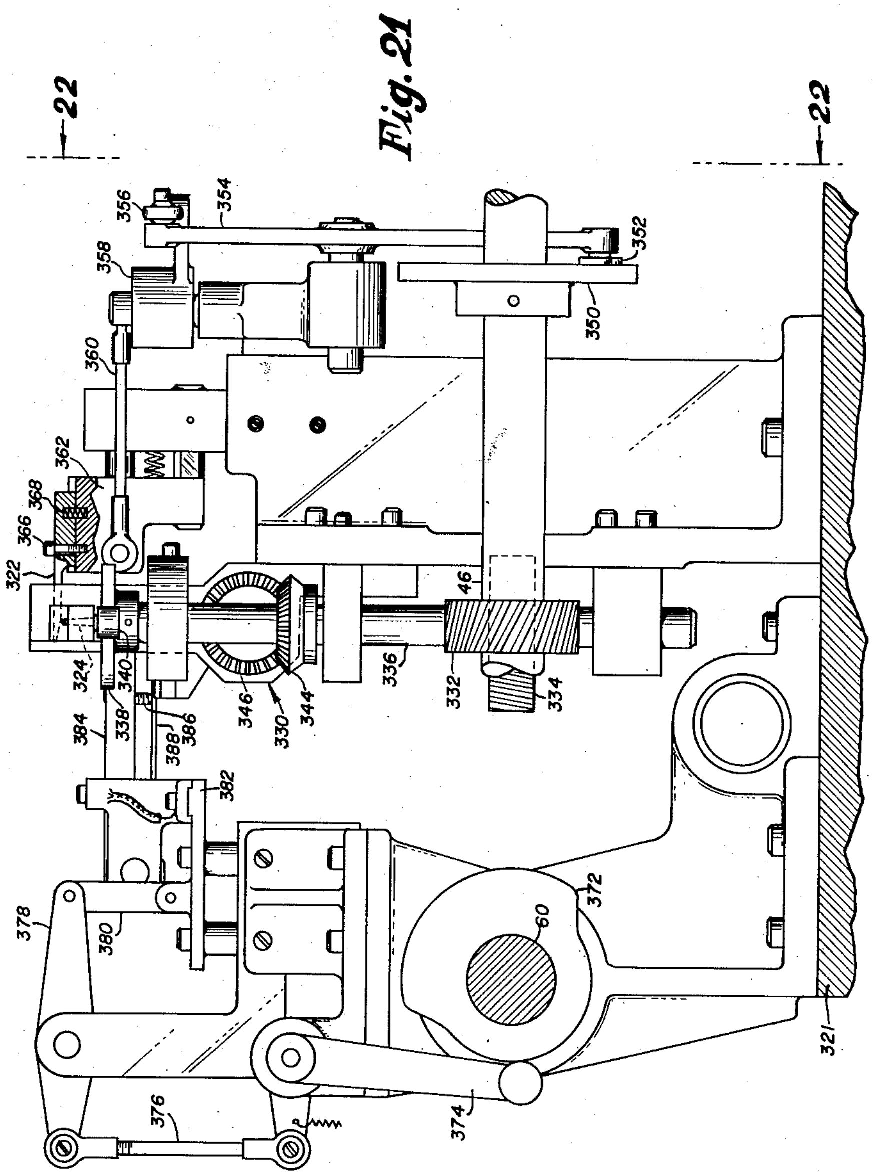

FIG. 21 is a view of the lower cathode sleeve welding mechanism at station No. 3, looking in the direction of line 21—21 in FIG. 1.

Figure 22:
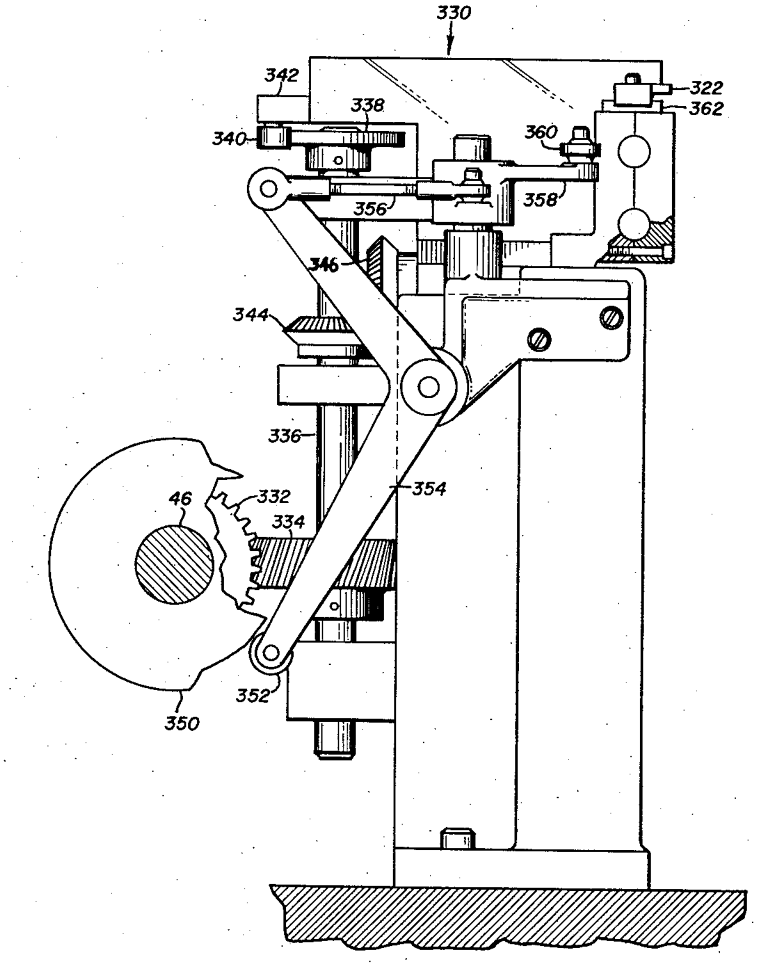

FIG. 22 is a view of the means for driving the tabbing ribbon feeding mechanism and the horizontally movable electrode at station No. 3 looking in the direction of the line 22—22 of FIG. 21.

Figure 23:
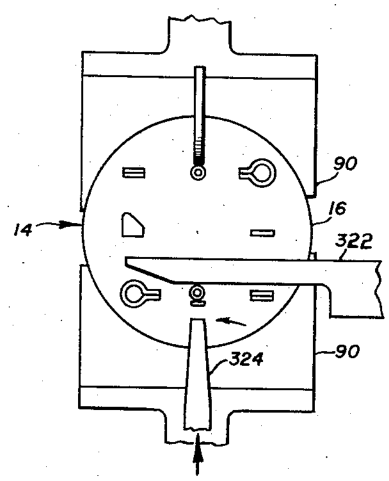

FIG. 23 is a view of the association of the electrodes and mount just prior to a welding operation at station No. 3.

Figure 24:
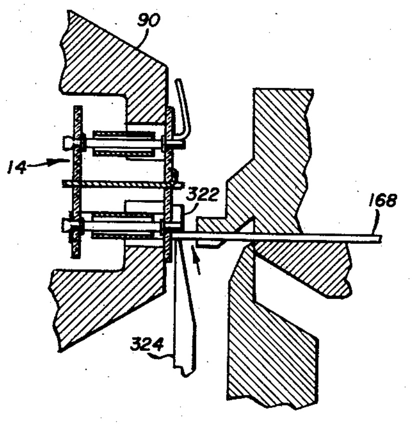

FIG. 24 is a section through the mount of FIG. 23 showing the electrodes in welding position.

Figure 25:
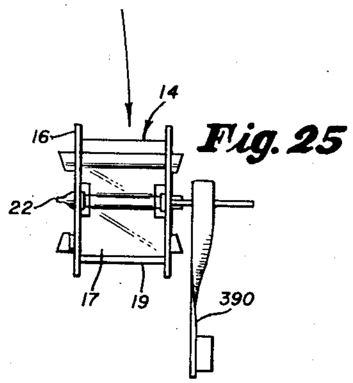
Figure 26:
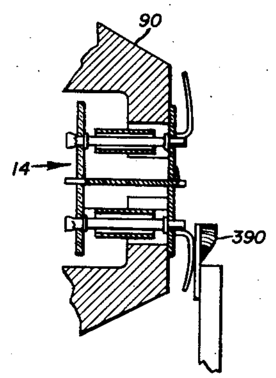

FIG. 25 is a detail showing a cam device about to engage a second tab on the mount for bending the free end downwardly with reference to the lower sleeve to which the tab is welded, and FIG. 26 is a sectional view, in elevation, showing the bent tab toward the end of the bending operation.

Figure 5:
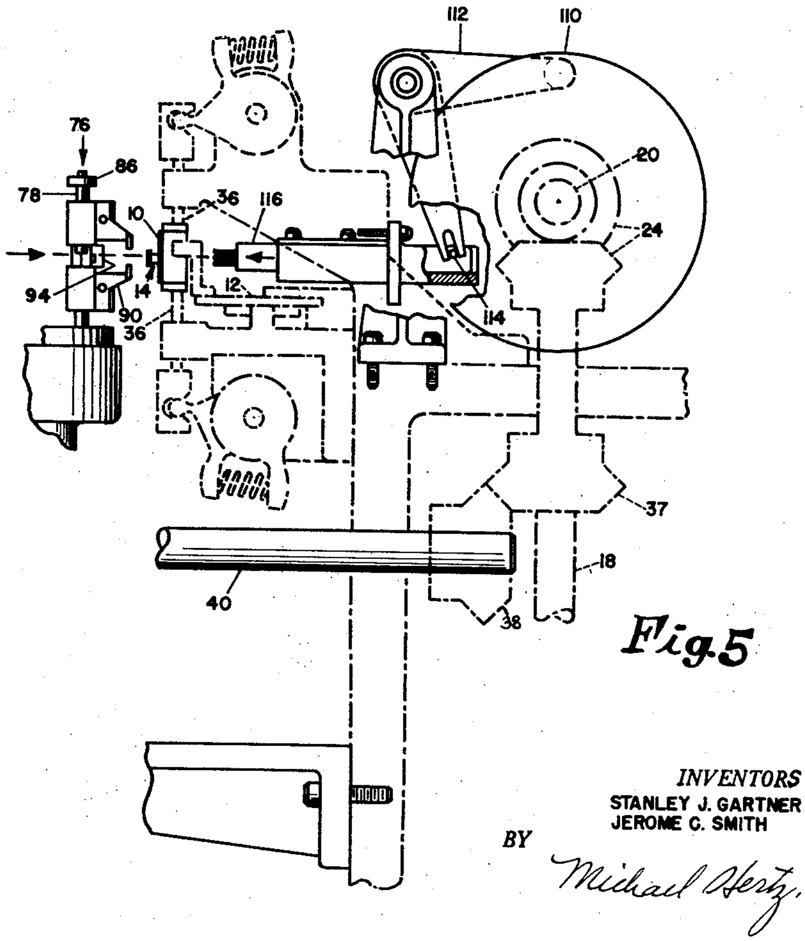
FIG. 5 is a view, partly in section, of a mount ejector mechanism.

Referring to the drawings with greater particularity, at 18, FIGS. 1 and 5, there is illustrated the main drive shaft of the main machine, and at 20 the power take-off shaft. The cathode tabbing station, in the manufacture of the exemplified mount, is in the last stage of the assembly stages looped about the machine. The shafts 18 and 20 of this disclosure correspond to the continuously driven shafts 18 and 20 of the machine illustrated in the application of Stanley J. Gartner Serial No. 406,930, filed January 29, 1954, the shaft 20 being driven from the shaft 18 by bevel gears 24, while the conveyor 12 shown in FIGS. 1 and 6 correspond to the looped intermittently driven conveyor 12 of that machine, the conveyor carrying equally spaced mount blocks 10 corresponding to but not being exactly like the mount blocks in that machine. The mount blocks differ from that of the referred to machine merely because a different type of mount is here illustrated as assembled by the instant machine. The instant machine, other than the tabber, is not shown in detail for the reason that, insofar as the invention here is concerned, it lies in the tabbing instrumentalities and in the timing operation of these instrumentalities with the intermittent advancing movement of the conveyor 12. The particular type of mount here shown as being tabbed is a 6AL5, the untabbed mount being shown in FIGS. 7 and 8. It should be understood that insofar as the principles of this invention are concerned and as set forth in the claims, other types of mount may be processed.

The exemplified type of mount 14, see FIGS. 7 and 8, comprises two insulating spacer discs 16 preferably of mica, between which are two anodes 17 and a central electrostatic shield 19. In recesses formed in the anodes and slightly spaced from the walls of the recesses are the coated cathode sleeves 22, each beaded at one end to rest against a mica. The other ends of the sleeves are to be tabbed by the mechanism of this invention.

At the tabbing stage there is a main bed 30, see FIGS. 1 to 3, on which is mounted the turret 32 capable of being indexed. Said bed and turret, see FIG 1, are movable toward and from a mount block 10, said block being indexed by the conveyor 12 to the position shown in FIG. 1, and held in such indexed position by pins 36 which move into recesses in the block. On the main sliding bed is a sub-bed 34, this sub-bed being movable with the main bed toward and from a mount block 10 but also movable on said bed transversely of said main bed. This sub-bed carries instrumentalities to tab one of the cathode sleeves of the 6AL5. The turret is indexed 90° with each complete to and fro movement of the bed and indexes from station 1 where it picks up a mount to station No. 2 where one of the cathode sleeves is tabbed. The turret indexes next to station No. 3 and after the main bed recedes from the block 10, the second sleeve is tabbed by instrumentalities fixed to the main machine. Station No. 4 is idle. As the turret indexes again to station No. 1, the tabbed mount is released from the turret and led off from the machine and also at this same station a new mount is postioned on the turret.

*Main sliding bed movement means*

The means for moving the main sliding bed 30 will now be described. See particularly FIGS. 1 and 5.

The main shaft 18 has affixed thereto a bevel gear 37 meshing with a bevel gear 38 fast on the back end of a shaft 40 mounted on the machine proper. This shaft at its forward end carries a bevel gear 42 meshing with a gear 44 fast on a second shaft 46 also mounted on the machine proper. Fixed on this shaft 46 is a cam 48 cooperating with a rocker arm 50, see FIG. 2, connected by a link 52 with a lever 54 pivoted intermediate its ends, and pivoted at its otherwise free end to the main sliding base as at 56. The cam track in the cam 48 is shaped to oscillate the arm through a complete cycle, once for each revolution of the cam, thus sliding the bed back and forth on the rails 57.

*The turret indexing mechanism and mount supports*

Figure 4:
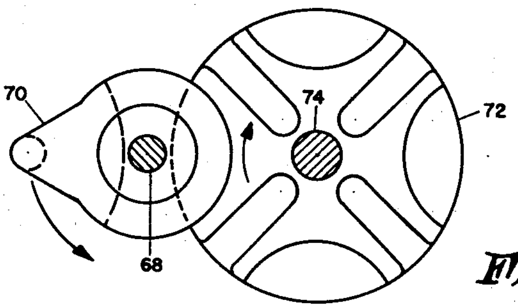
FIG. 4 is a plan view of Geneva mechanism utilized to index a turret of the tabbing mechanism.

The turret mechanism is intermittently rotated 90° by the following:

At the left hand end of shaft 46, see FIG. 1, are meshing miter gears 58 driving a hollow shaft 60 to which is keyed a shaft 62 rotatable with the shaft 60 but slidable relative thereto. On shaft 62 is fixed a spiral cut gear 64 meshing with a similar gear 66, see FIG. 2, fixed on a vertical shaft 68 and rotatable in ball bearings fixed with relation to the main sliding bed 30. Mounted on the shaft 68 is the driver 70, see FIG. 4, of a Geneva movement, the star wheel of which is designated as 72. The star wheel is mounted on a shaft 74 supported in ball bearings in a bearing mounted on the main sliding bed 30. Thus rotation of the shaft 46 not only effects reciprocation of the sliding bed toward and from a block 10 but also effects intermittent rotation of Geneva star wheel 72. The star wheel on its supper surface supports four identical mount supporting and clamping mechanisms 76. These mechanisms are spaced 90° about the turret and each comprises a pair of parallel upright posts 78 on which are slidable upper and lower blocks 80 spring pressed toward each other by coiled springs 82 and 84, the coil spring 82 resting against a header bar 86 bridging a pair of said posts and the spring 84 reacting against the turret top. Stops 88 on the posts limit the approach movement of the blocks. These blocks carry clamp jaws 90 adapted to engage the mount, as will be described. To separate the jaws, each pair of jaws is provided with a pair of toggle links 92, the free ends of which are connected with the blocks and the knee of which is provided with a roller 94 against which is imposed a thrust to straighten the toggle, the thrust being imparted to the roller by a fork 96, see also FIG. 6. The fork is mounted on a slide bar 98 fixed with reference to the main sliding bed and the bar is reciprocated by a link 100 connected to a double armed lever 102, the lower end of which rides in a cam 104 fixed on the shaft 62. As the main sliding bed approaches a block 10, the fork 96 engages the knee of the toggle to release the mount from the jaws. The jaws do hold the mounts in position while the turret indexes to enable the tabs to be affixed to the cathode sleeves.

*Mount transfer from mount block to clamp jaws*

To transfer an assembled mount from a mount block to the jaws, the following mechanism is provided:

Fixed to the take-off shaft 20, see FIGS. 1 and 5, is a cam 110 operative to oscillate a bell crank lever 112, the lower end of which is forked and straddles a pin 114 mounted in a mount ejector slide 116 carrying at its front end ejector pins 118 and 120, see FIGS. 6 and 7. The pins 120, one of which is slit, engage over and against the tabs 122 on the mount 14 and operate to thrust the mount off the mounting pins 126, on the mount block 10, while pins 118 thrust against an insulating spacer 16 for the same reason. The pins 126 and 128 serve to support the anodes and cathode sleeves respectively, during assembly of parts, these elements being assembled after a bottom mica had been inserted in the mount block. Pins 118 and 120 operate to thrust the mount into the jaws 90 now loosely receiving the mount. The mount ejecting cam 110, the main slide bed advancing cam 48, and jaw opening cam 104 are so related that as the bed is advancing toward the mount the jaws initially close loosely about the mount in a position between the spacers 16. This initial position is shown in FIG. 9. While in this position the ejector pins 118 and 120 move in through the mount block and thrust the mount so that the right hand mica 16, FIG. 9, on the mount moves toward the face of the jaws 90. The fork 96 is then moved back to allow the springs 82 and 84 acting on the jaw blocks to exercise their force and cause the jaws, see FIGS. 10 and 11, to contact the anodes. The pins 118, 120 are next withdrawn, the main bed 30 is withdrawn from the mount block, the conveyor 12 is indexed until another loaded mount block replaces the mount block 10 and the turret 32 is indexed to the 2nd or top cathode sleeve tabbing station.

*Top cathode sleeve tab welder*

It should be noted that the mounts are so positioned in the jaws that the cathode sleeves are vertically aligned with respect to one another.

After the mount had been positioned as previously described, the turret had been indexed to move the mount to the second station and the bed 30 with its turret 32 had moved back away from the mount block carrying conveyor 12. At this second station, a tabbing ribbon is fed over the top cathode sleeve and welding electrodes, movable to positions below the sleeve and above the tabbing ribbon, weld the ribbon to the sleeve. The ribbon is cut at a small distance from the weld thus leaving a tab on the sleeve. The ribbon is brought over the sleeve by mechanism illustrated particularly in FIGS. 3 and 12 to 15.

The shaft 62, see FIG. 1, left-hand side, extends toward the rear of the machine and is mounted against longitudinal movement with respect to the bed 30 by collar and plate connection 130, or other equivalent arrangement, so that as the bed is shifted by the lever 54, the shaft 62 will telescope with relation to shaft 60, but will remain in rotative driving relationship therewith. On the shaft 62 is fixed a bevel gear 132 meshing with a bevel gear 134 fixed on a shaft 136 rotatively mounted in suitable pillow blocks on the bed 30. This shaft 136 has affixed thereto a wide gear 138 meshing with a gear 140 fixed on a shaft 142 in bearing blocks on the sub-bed 34. At the right hand end of shaft 142, see FIG. 1, is a gear 144 meshing with a gear 146 fixed on a shaft 148 also on the sub-bed. As stated before, the shafts 142 and 148 are mounted in bearing blocks fixed to sub-bed 34, the wide gear 138 being provided to insure continuous driving relationship to the gear 140 as the sub-bed is reciprocated transversely of the main bed. The shaft 148 carries a spiral gear 150, see FIG. 12, meshing with a spiral gear 152 on the vertical shaft 154 journaled in bearings carried by a ribbon feed and cut-off unit 155 mounted on support block 156, FIG. 1, in turn mounted on the sub-bed 34. At the upper end of this shaft 154 is a ribbon feeding cam 157 cooperating with a follower roller 158 mounted on a slide 160 spring pressed by a spring 161, see FIG. 15, so that the roller always follows the cam. The slide 160, see FIG. 14, is comprised of three parts 162, 164, and 166. The portion 162 is a block permanently attached to the main slide bar 164, the portion 162 having a longitudinal groove 167 therein to accommodate a thin flat ribbon 168 of tabbing material. The main bar is thickened in height toward the left and slidingly accommodates the part 166 which functions as a ribbon clamp. The clamp includes a web 170 slidable in a slot 172 in the bar 164 and a clamp ridge 174 engageable with the lower surface of the ribbon 168 as it traverses the groove 176, the groove being aligned with the groove 167. Wing portions 178 guide the clamp in its vertical reciprocating motion in a bearing support 180 mounted on block 156 in turn mounted on the sub-bed 34 and also fit in a recess 181 in the block 164 for reciprocating movement with the bar. The clamp bar is urged to ribbon release position by compression springs 184. To clamp the ribbon between clamp 166 and bar 164, the vertical shaft 154 is provided with a bevel gear 186 meshing with a similar gear 188 on horizontal cam shaft 190 on which is mounted a cam 192 cooperating with a follower 194 mounted in a forked arm 196, see FIG. 13, this arm being affixed to one end of a spring leaf 198 the other end of which is attached to a thruster 200 by suitable means, the upper end of the thruster, by means of forked arms, supporting a roller 202 which is urged against the lower face of the clamp 166. As the cam 192 rotates, the thruster is periodically resiliently pressed against the clamp.

To the left of the just described clamping mechanism, as viewed in FIG. 12, is a second clamping mechanism of which the top block 204 is stationary and forms part of the unit 155. The lower clamp block 206 is mounted on a leaf spring 208 similar to the spring 198 and this leaf spring is similarly mounted on a forked arm 210 carrying a roller riding on a cam 212 mounted on the shaft 190. The two cams 192 and 212 are shaped to cause the two clamping mechanisms to work in alternation and while the clamp bar 166 is operative to clamp the ribbon to the slide bar 164, the slide cam 157 is operative to feed the ribbon to a new position between the clamp blocks 204 and 206.

The shaft 190 carries a third cam 214, this operating directly on a follower roller 216 mounted in the lower end of a cutter bar slide 218 which carries at its upper end the movable cutter 220 of a pair of shears, the upper fixed shear member 222 being mounted on the block 204. A spring 224 is operative to maintain the follower 216 against the cam 214. The timed relation of the machine is such that the cutter will function after a weld of the ribbon on the cathode sleeve has been effected, the feed of the ribbon over the sleeve being effected after an indexing operation of the turret. To assist in guiding the slide 160 in its reciprocatory movement there is provided a pair of guide rollers 226.

To effect the welding operation of the ribbon 168 to the top of the upper cathode sleeve of the mount there is employed, see FIGS. 1 to 3, 16 and 17, a horizontally movable electrode 230 and a vertically movable electrode 231. These electrodes are moved as follows: On the vertical shaft 154, see FIG. 3, is mounted a spur gear 232 meshing with a similar gear 234 on a vertical shaft 236 rotatable in bearings carried by the support block 156. At the upper end of this shaft, see FIGS. 2 and 3, is a cam 238, operative on a roller 240 on a bell crank 242, see FIG. 2, the opposite end of which is connected by a link 244 in turn connected to a second bell crank 246 which in turn is connected via a link 248, see FIG. 1, to a pin 250 extending laterally from an electrode carriage 251, see FIG. 16. The electrode carriage is mounted to slide on a horizontal way 252 and guide rod 254 mounted on a way support 255 fixed to the support block 156. A pair of springs 256 normally urges the carriage forward on the guide rod against a stop 257 and also urges the roller 240 against the cam 238. The electrode 230 is loosely mounted on the carriage 251 through a loose fitting pivotal connection at 258 and is spring urged upwardly at its free end by a spring 260 reacting between the electrode and carriage. The electrode is bevelled at its forward end as at 262, so that as the electrode moves forwardly, that is, to the right in FIG. 16, the bevelled surface first engages the cathode sleeve and subsequently wipes across the same while being depressed slightly, thereby compressing the spring 260. This affords cleaning of the contact area between the electrode and sleeve and also provides for proper spring pressure of the electrode against the sleeve without injury thereto due to excessive pressure.

The top electrode 231, see FIG. 2, is operated by a cam 264, fixed on shaft 148. This cam operates against follower roller 266 on two armed lever 268, the opposite end of which is connected by a link 270 to a lever 272 supported from an extension on the unit 155, the left hand of said lever in FIG. 2 being forked and pivotally connected via a short link to a stud 273 mounted on a horizontal insulating bar 274, said bar having guide shafts 276 sliding vertically in a bearing 278 fastened onto a part secured to block 156. A spring 279 normally maintains the electrode 231 elevated and the cam follower 266 against the cam 264. The insulating bar 274 extends beyond the guide shafts toward the chain 12 and on its free end is mounted the plate 280 having an upright eared portion 282 forming a pivotal connection for electrode support beam 284 at the free end of which is detachably and adjustably mounted the vertical electrode 231. The member 282 carries an adjustable stop 286 for limiting the downward position of the beam 284, while a spring 288 secured to the part 282 operates on a screw 290 extending up from the beam. An electric conductor 292 is attached to the plate 280. On operation of cam 264, the rod 270 is lifted and insulating bar 274 is depressed against the action of the spring 279. The plate 280 is thus depressed carrying with it the electrode 231 until the electrode contacts the ribbon tabbing material 168 as shown in FIG. 18. Thereafter the plate 280 is further depressed causing the spring 288 to apply pressure to the electrode as the beam 284 rotates about its pivot. In this action stop 286 is withdrawn from the beam and the tip of the electrode wipes across the tabbing material, as indicated by the arcuate arrow in FIG. 18. On continued rotation of the cam 264, the spring 279 reacts and brings the stop 286 against the beam 284 thus effecting separation of the electrode 231 from the tabbing ribbon. Obviously current is applied to the electrode when in contact with the ribbon. At this time also, the lower grounded electrode 230 is supporting the sleeve and completing the electrical circuit, as shown in FIG. 18. In practice this welding operation is performed as the main sliding bed is moving toward the mount blocks 10, the welding electrodes being withdrawn just before the bed 30 has completed its forward motion. As indicated heretofore, the tab material is cut by the cutter blades 220, 222 after the weld and before the next index operation of the turret.

*Sub-bed moving means*

The tab feeding instrumentalities and top cathode sleeve tab welder are normally removed from the mount held by the jaws on the turret to permit turret indexing. The sub-bed is moved toward the turret to proper welding position in timed relation to the indexing movement of the turret, see FIGS. 1 to 3, by a grooved cam 300 on shaft 136, this cam cooperating with a follower on a bell crank lever 302 (see FIG. 3), this lever being connected by a link 304 to a bell crank 306 in turn connected to an end of still another link 308 whose other end is pivotally connected to the sub-bed 34 as by a depending pin 310. The sub-bed slides on ways comprising a bar 312 and a guide rod 314.

*Upper tab flipper*

In indexing movement of the turret from the first weld position, station No. 2, to a second weld position, station No. 3, means are provided to move the tab on the upper sleeve out of the way by flipping the same upwardly.

In the path of movement of the tab as the turret rotates is a cam 316 shown in detail in FIGS. 19 and 20. The cam is a leaf member with a right angle twist mounted on a post 318 on the main machine, the cam being in the line of movement of the tab near its sleeve. The horizontal portion of the leaf engages beneath the tab as the turret is indexed and because of the 90° twist of the leaf as shown in FIGS. 19 and 20, bends the tab upward as the turret indexes. The upper tab 320 is shown in the initial and final positions in the two figures.

*Bottom cathode sleeve tab welder*

The sliding of the main bed 30 alternately brings the mounts on the turret to where they can be discharged at station No. 1, and also pick up new mounts at this station and to a station No. 3 where tabs may be welded onto the lower sleeves. For this purpose at station No. 3 the tab material feeder and welder are not made movable relative to the main sliding bed but are fixed to the main machine frame 321, see FIG. 21.

The bottom sleeve tab feeder and welder is much like the feeder and welder at station No. 2 except that the electrodes of the welder are inverted, with the horizontal welder 322 on top and the vertical welder 324 below the bottom cathode sleeve. The mechanism involving these electrodes is shown in FIGS. 1 and 21 to 24.

The means for feeding and cutting off the ribbon at station No. 3 involves the alternately operable clamp means and cutters of FIG. 12 and is not again shown in detail. That mechanism is designated as 330 in FIG. 1. The means for driving this mechanism comprises a spiral gear 332 on shaft 46, see FIGS. 1, 21 and 22, meshing with a spiral gear 334 on a vertical shaft 336 at the upper end of which is a cam 338 and follower 340 corresponding to the cam 157 and follower 158 of FIG. 12. These control the reciprocation of the ribbon feed slide bar 342. Also fixed on the shaft 336 is the bevel gear 344 meshing with the gear 346 to drive the cams for moving the clamp mechanisms and the ribbon cutter blade.

The means for moving the horizontal electrode 322 of station No. 3 includes a cam 350 fixed on shaft 46 operative on a cam follower 352 on a bell crank lever 354 pivotally mounted on a part fixed to the main machine, the upper end of this lever being connected by a link 356 to a bell crank lever 358 in turn connected by a link 360 to the spring pressed electrode carriage 362. This carriage, like carriage 251, slides on a way and on a guide rod. It mounts the horizontal electrode 322 by means of loose pivot pin 366, and the electrode is spring pressed toward cathode sleeve engaging position by spring 368.

The lower vertically movable electrode 324 is operated via shaft 60, cam 372 fast on the shaft, two-armed lever 374, link 376, lever 378, link 380, and spring pressed insulating plate 382 as in the case of the first vertical electrode operating mechanism. In this case the beam 384 corresponds to the beam 284 and has its screw 386 directed downwardly; the leaf spring 388 is below the beam. On the upward motion of the plate 382, the spring 388 is below the beam. On the upward motion of the plate 382, the spring 388 will engage the screw 386 and urge the electrode 324 into contact with the tabbing ribbon opposite the cathode sleeve as it performs a wiping action on the ribbon, as indicated by the arcuate arrow in FIG. 24.

*Lower tab flipper*

As the turret indexes from station No. 3 to station No. 1, the lower tab is flipped downwardly by a fixed cam 390 in the path of movement of the lower tab, see FIGS. 1, 25 and 26. This cam is much like the cam of FIGS. 19 and 20 except that the leaf of the cam 390 is twisted reversely with respect to the leaf 316. As a result of the use of both cam leaves, when the turret is indexed to station No. 1, the two tabs are close to the mount and do not interfere with ejection of the mount from the clamp jaws on the turret and subsequent removal of the tabbed mounts from the machine.

*Turret unloading*

After the turret has indexed so that a tabbed mount faces a mount block 10 on the chain 12, see FIGS. 1 and 6, and before the main bed 30 is advanced for receiving another mount, unloading mechanism releases the tabbed mount from between the jaws 90, and directs the mount from out of the jaws onto a conveyor, the transfer of the mount from jaws to conveyor being expedited by a blast of air. Mounted on the shaft 62 is the cam 104 which, through instrumentalities already described, operates the fork 96 which in turn presses against the knee 94 of the toggle links and serves to separate the jaws 90. Mounted on the slide which carries the fork 96 and movable with the fork is the tined director 392 which loosely straddles a portion of the mount as the fork 96 straddles the knee 94. The director provides an initial path along which the mount moves under the impetus of a blast of air from the nozzle 394 alongside of the director. When the mount is blown off the director, it falls onto a conveyor 396 which carries the mount to any convenient point of disposal.

Having thus described the invention, what is claimed is:

1. In a machine for manufacturing electron tube mounts, a conveyor, a tabbing mechanism adjacent said conveyor, said mechanism comprising a turret mounted on a bed movable toward and from the conveyor and movable welding electrodes mounted on a fixed portion of the machine, a mount clamping means on the turret and rotatable therewith, means operative on the approach movement of said bed toward the conveyor for transferring a mount from said conveyor to the clamping means, means operative when the said clamping means has revolved 180° and moved away from said conveyor for causing said welding electrodes to affix an electro-conductive element to the mount, and drive mechanism for operating the conveyor, the previous referred to mechanism and the several means in timed relationship.

2. In a machine for manufacturing electron tube mounts, a conveyor, a mechanism for applying electrical conductive elements to electrodes adjacent said conveyor, said mechanism comprising a turret mounted on a bed, a sub-bed, said bed being movable toward and from the conveyor and movable welding electrodes mounted on said sub-bed, said sub-bed being reciprocatable on the bed and transversely of the movement of said bed, a mount clamping means on the turret and rotatable therewith, means operative with the approach movement of said bed toward the conveyor for transferring a mount from said conveyor to the clamping means, and means operative when said clamping means has rotated 90° from the said first position and the sub-bed has moved toward the clamping means on the turret to cause the welding electrodes to operate on the mount to affix an electro-conductive element thereto.

3. In a machine for manufacturing electron tube mounts, a conveyor, a mechanism for applying electrical conductive elements to electrodes adjacent said conveyor, said mechanism comprising a turret indexible on a bed, a sub-bed, said bed being movable toward and from the conveyor, first movable welding electrodes mounted on said sub-bed, said sub-bed being reciprocatable on the bed and transversely of the movement of said bed, second movable welding electrodes on a fixed part of the machine, a number of mount clamping means arranged circumferentially of said turret, means operative with each approach movement of said bed toward the conveyor for transferring a mount from said conveyor into the clamping means, means operative for each indexing movement of the turret for moving the sub-bed toward the mount held in the clamping jaws opposite the first welding electrodes, means for closing the first welding electrodes to effect a welding of an electro-conductive element on the mount, means operative upon each indexing movement of the turret and movement of the bed away from the conveyor for causing the second welding electrodes to move toward each other and affix a tab on the mount and means operative on each indexing movement of the turret to release a mount which had been subjected to the two welding operations from between its clamping means.

4. In a machine for manufacturing electron tube mounts, the combination of a conveyor, stem blocks mounted on said conveyor, a second conveyor movable in front of said first conveyor, and means to transfer a mount in a stem block to said second conveyor comprising a pair of jaws on said second conveyor spring pressed to move toward each other, common means for operating said conveyors and the above means, a toggle comprising a pair of links pivotally connected together to form a knee between the links, said toggle connecting the jaws, means operative on the knee of the toggle to separate the jaws, pin ejector means operative to move through a stem block to engage a mount supported by the block to thrust the same out of the block and into the opened jaws and means to effect an assembly operation on the mount while on the second conveyor, and means to operate the conveyors and the various means in synchronized relation.

5. In a machine for manufacturing electron tube mounts, the combination of a first conveyor, stem blocks mounted on said first conveyor, a closed path conveyor movable in front of said first conveyor, means to remove a mount from said second conveyor and to furnish the second conveyor with another mount, said means comprising a pair of jaws on said second conveyor, spring biased toward each other, a toggle comprising a pair of links pivotally connected together to form a knee between the links, said toggle connecting said jaws, release means movable toward the knee of the toggle to move the same to separate the jaws, a director having at least one horizontal tine movable with the release means to cause the tine to lie close to and beneath a mount, a nozzle directing a blast of air against the mount to remove the same from between the jaws when the jaws are separated and the tine is below the mount and means to load the same unloaded jaws with another mount comprising pin ejector means operative through a stem block and engageable with a mount positioned therein to thrust the mount between the jaws, means to process the mount while on the second conveyor and means to operate the conveyors, the processing means, director means, jaw opening means, and pin ejector means in synchronized relation.

6. In a machine for manufacturing electron tube mounts, a closed path conveyor, a receiver adjacent the conveyor, pairs of jaws, adapted to grasp mounts, spring pressed toward each other on said conveyor, means to effect an assembly operation on the mounts while held in said pair of jaws, a toggle comprising a pair of links pivotally connected together to form a knee between the links, said toggle connecting said jaws, means movable toward and operative on the knee of the toggle to separate the jaws, a director movable with the jaw separating means, said director having at least one tine positionable beneath a mount held by the jaws, and a nozzle directing a blast of air in the direction of the mount, parallel to the tine to direct a mount from between the jaws and into the receiver when the same are separated, and means for driving the conveyor and jaw separating means in timed relationship.

7. In a machine for manufacturing electron tube mounts, an indexible turret, means for supporting mounts having electrodes arranged in horizontal position, to be tabbed, arranged adjacent the periphery of said turret, means for applying tabs to said electrodes with the tabs parallel to the electrodes, a stationary vertical post on the machine mounted adjacent the periphery of the turret, said post supporting a horizontal leaf with a right angle twist therein, the free end of the leaf extending with its surface horizontal and in the direction of an oncoming tab and at an elevation to engage a surface of said oncoming tab.

8. In a machine for manufacturing electron tube mounts, said machine having a main shaft, an intermittently movable conveyor carrying stem blocks on which mounts are assembled, said machine also having a tabbing station at which tabs are applied to said mounts, a main sliding bed at said station movable to and from said stem blocks, an indexible turret on said bed, a sub-bed on said main bed movable toward and away from said turret, welding electrodes on said sub-bed, said electrodes being movable toward each other, means for moving the bed, turret, sub-bed and welding electrodes comprising shafting arranged in quadrangular form, the first shaft of the quadrangle being driven from the main shaft and arranged perpendicularly to the conveyor and in a horizontal plane, the second shaft also lying in a horizontal plane and driven from said first shaft, said second shaft having drive connections with the bed to move the same toward and from the stem blocks, the third shaft being driven from said second shaft, said third shaft having a portion mounted against longitudinal displacement and a portion telescopic therewith but rotatable with the other portion, said telescopic portion having drive connection with the indexible turret, the fourth shaft being driven from said telescopic portion and having a wide driving gear, a pinion on the sub-bed meshing with said wide gear and operatively connected to said electrodes to move the same, and means on said fourth shaft to shift the sub-bed on the main bed to bring the electrodes toward and from the turret.

9. In a machine for manufacturing electron tube mounts, said machine having a main shaft, an intermittently movable conveyor carrying stem blocks on which mounts are assembled, said machine also having a tabbing station at which tabs are applied to said mounts, a main sliding bed at said station movable to and from said stem blocks, an indexible turret on said bed, a sub-bed on said main bed movable toward and away from said turret, welding electrodes on said sub-bed, said electrodes being movable toward each other, additional welding electrodes movable toward and from each other mounted on a fixed portion of the machine, means for moving the bed, turret, sub-bed and welding electrodes comprising shafting arranged in quadrangular form, the first shaft of the quadrangle being driven from the main shaft and arranged perpendicularly to the conveyor and driven from said first shaft, said second shaft having drive connections with the bed to move the same toward and from the stem blocks and with the additional welding electrodes, the third shaft being driven from said second shaft, said third shaft having a portion mounted against longitudinal displacement and a portion telescopic therewith but rotatable with the other portion, said telescopic portion having drive connection with the indexible turret, the fourth shaft being driven from said telescopic portion and having a wide driving gear, a pinion on the sub-bed meshing with said wide gear and operatively connected to said electrodes to move the same, and means on said fourth shaft to shift the sub-bed on the main bed to bring the electrodes toward and from the turret.

10. In a machine for manufacturing electron tube mounts, said machine having a main shaft, an intermittently movable conveyor carrying stem blocks on which mounts are assembled, said machine also having a tabbing station at which tabs are applied to said mounts, a main sliding bed at said station movable to and from said stem blocks, an indexible turret on said bed, a sub-bed on said main bed movable toward and away from said turret, welding electrodes on said sub-bed, said electrodes being movable toward each other, means supplying tab material to the electrodes mounted on said sub-bed, additional welding electrodes movable toward and from each other mounted on a fixed portion of the machine, means for moving the bed, turret, welding electrodes, sub-bed, and tab material supplying means comprising shafting arranged in quadrangular form, the first shaft of the quadrangle being driven from the main shaft and arranged perpendicularly to the conveyor and in a horizontal plane, the second shaft also lying in a horizontal plane and driven from said first shaft, said second shaft having drive connections with the bed, with the additional pair of electrodes and its tab material supply means, the third shaft being driven from said second shaft, said third shaft having a portion mounted against longitudinal displacement and a portion telescopic therewith but rotatable with the other portion, said telescopic portion having drive connection with the indexible turret, the fourth shaft being driven from said telescopic portion and having a wide driving gear, a pinion on the sub-bed meshing with said wide gear and operatively connected to said sub-bed carried electrodes and its tab material supply means to move the same, and means on said fourth shaft to shift the sub-bed on the main bed to bring the electrodes toward and from the turret.

11. In a machine for manufacturing electron tube mounts, the combination of a conveyor provided with spaced blocks for supporting mounts, an indexible turret rotatably mounted adjacent said conveyor, means for indexing the turret through at least 360 degrees, pairs of clamp jaws arranged about the periphery of said turret, ejector means on said machine operative on a mount in a block when opposite a pair of jaws for transferring the mount to between said pair of jaws, means for closing the jaws on said mount, mount assembling means stationed about the turret for operating on the jaw held mounts as the turret indexes, and means for removing the mounts from between the jaws upon the turret being indexed through 360 degrees, said last means comprising a director for supporting and guiding the mount and along which the mount moves upon release of the mount by the jaws, and means for directing a blast of air to the mount to move the mount along and beyond the confines of the director.

References Cited in the file of this patent

UNITED STATES PATENTS

| | | |
|---|---|---|
| 1,821,894 | Otaka | Sept. 1, 1931 |
| 2,342,049 | Holmbeck | Feb. 15, 1944 |
| 2,379,002 | Haller | June 26, 1945 |
| 2,432,750 | Goldsworthy | Dec. 16, 1947 |
| 2,498,455 | Schneider et al. | Feb. 21, 1950 |
| 2,650,634 | Young et al. | Sept. 1, 1953 |
| 2,688,065 | Clark | Aug. 31, 1954 |
| 2,729,877 | Roeber et al. | Jan. 10, 1956 |
| 2,823,296 | Clough et al. | Feb. 11, 1958 |
| 2,846,561 | Pityo | Aug. 5, 1958 |

FOREIGN PATENTS

| | | |
|---|---|---|
| 615,889 | Great Britain | Jan. 13, 1949 |